(12) United States Patent
Wu et al.

(10) Patent No.: US 8,369,118 B2
(45) Date of Patent: Feb. 5, 2013

(54) SYNCHRONOUS RECTIFYING DRIVE CIRCUIT WITH ENERGY FEEDBACK FOR VOLTAGE DOUBLER RECTIFER

(75) Inventors: Xinke Wu, Eastcom (CN); Delai Jiang, Eastcom (CN); Xiaojun Guo, Eastcom (CN); Guichao Hua, Zhejiang (CN)

(73) Assignee: Inventronics (Hangzhou), Inc. (CN)

( * ) Notice: Subject to any disclaimer, the term of this patent is extended or adjusted under 35 U.S.C. 154(b) by 263 days.

(21) Appl. No.: 12/796,662

(22) Filed: Jun. 8, 2010

(65) Prior Publication Data

US 2010/0309701 A1  Dec. 9, 2010

(30) Foreign Application Priority Data

Jun. 8, 2009 (CN) .......................... 2009 1 0099060

(51) Int. Cl.
*H02M 7/217* (2006.01)

(52) U.S. Cl. ............................ 363/127; 363/52; 363/53

(58) Field of Classification Search ............... 363/21.06, 363/21.14, 52, 53, 127
See application file for complete search history.

(56) References Cited

U.S. PATENT DOCUMENTS

| 5,991,171 A * | 11/1999 | Cheng ........................ 363/21.03 |
| 6,016,261 A * | 1/2000 | De Wit et al. ................ 363/21.14 |
| 6,597,587 B1 * | 7/2003 | Poon et al. .................. 363/21.06 |
| 2009/0262560 A1 * | 10/2009 | Hua et al. .................... 363/21.06 |

* cited by examiner

*Primary Examiner* — Adolf Berhane
*Assistant Examiner* — Gustavo Rosario Benitez
(74) *Attorney, Agent, or Firm* — Terry M. Sanks; Beusse Wolter Sanks Mora & Maire, P.A.

(57) ABSTRACT

A current-driven synchronous rectifying drive circuit designed for a T-type voltage doubler rectifier with an energy feedback circuit including a clamp and energy feedback circuit, a high frequency transformer, a current transducer, an energy storage capacitor, an output capacitor, a first and a second synchronous rectifier, and a first drive circuit connected to the first synchronous rectifier and a second drive circuit connected to the second synchronous rectifier.

20 Claims, 10 Drawing Sheets

SYNCHRONOUS RECTIFYING DRIVE CIRCUIT WITH ENERGY FEEDBACK FOR VOLTAGE DOUBLER RECTIFER

CROSS-REFERENCE TO RELATED APPLICATIONS

This application claims priority of Chinese Patent Application No. 200910099060.2 filed Jun. 8, 2009, which is incorporated herein by reference.

BACKGROUND OF THE INVENTION

Exemplary embodiments of the present invention relate to a drive circuit of a synchronous rectifier, and more specifically, to energy feedback in a current-driven synchronous rectifier (SR) designed for a voltage doubler rectifier.

With the development of semiconductor technology, the on-resistance of low and middle voltage MOSFET has decreased. In order to reduce conduction loss, a synchronous rectifier (SR) is used in low voltage high current switching power applications. In some low and middle voltage DC-DC and AC-DC applications, the output voltage could be 48 volts (V) and/or higher. If a half-wave rectifier or a center-tapped rectifier is used in such high voltage applications, the voltage stress of the rectifier is too high to use low voltage rectifiers to reduce the conduction loss. When the voltage of a MOSFET is above 200V, both the cost of the MOSFET and the on-resistance increases, and thus is not suitable for synchronous rectification applications. Therefore, for a conventional rectifying circuit, when the output voltage of a rectification circuit is above 60V, normal diode rectification is usually adopted. However, there could be certain oscillation between a transformer leakage inductance and an intrinsic capacitance in circuit. The oscillation may cause a voltage spike and as a result, the voltage stress of the rectifying components may be much higher than that in the ideal conditions.

A voltage doubler rectifier is able to eliminate a voltage spike across the rectifying components and reduce the voltage stress, by clamping the withstanding voltage of the rectifier at the same level of the output voltage. Therefore, a low voltage MOSFET can be used for synchronous rectification to reduce the conduction loss. However the conventional method of driving a MOSFET by sensing current signal requires a current transducer (CT) with large turns in its windings. In particular, when the output current is very high, there will be too much energy transferred to the drive circuit. If this part of redundant energy could not be fed back to the source of the output voltage, there would be additional loss. In light of the particularity of the voltage doubler rectifying circuit, one of the SR drive circuits needs to be ground-floated. So when using traditional current-driven rectifiers, it's impossible to have both SR's driving energy fed back to the output.

SUMMARY OF THE INVENTION

A current-driven synchronous rectifying drive circuit designed for a T-type voltage doubler rectifier with an energy feedback circuit including a clamp and energy feedback circuit, a high frequency transformer, a current transducer, an energy storage capacitor, an output capacitor, a first and a second synchronous rectifier, and a first drive circuit connected to the first synchronous rectifier and a second drive circuit connected to the second synchronous rectifier.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which.

DETAILED DESCRIPTION

Reference will be made below in detail to exemplary embodiments of the invention, examples of which are illustrated in the accompanying drawings. Wherever possible, the same reference numerals used throughout the drawings refer to the same or like parts.

In order to feed the redundant energy (received by the SRs from the CT) back to the output, the present invention proposes a new solution. By using a T-type voltage doubler rectifier, the driving voltage of the upper SR of the rectifier can be clamped to the voltage of the energy storage capacitor, and the redundant energy in the lower SR is fed back to the same energy storage capacitor through a diode. The solution is simple to implement and it improves the driving efficiency as explained in further detail below.

Figure 1:
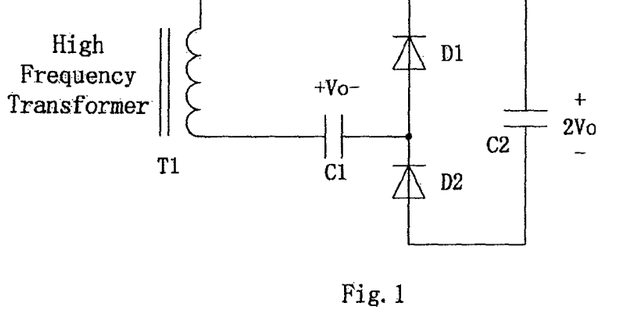
FIG. 1 is a schematic diagram of a T-type voltage doubler diode rectifier.

FIG. 1 is a schematic diagram of a T-type voltage doubler diode rectifier. When the secondary voltage of the high frequency transformer is negative on top and positive on bottom, the diode D1 turns on, and the voltage of the capacitor C1 is charged to Vo. When the secondary voltage of the high frequency transformer is positive on top and negative on bottom, the diode D2 turns on, and the voltage of the capacitor C2 is charged to 2 Vo.

Figure 2:
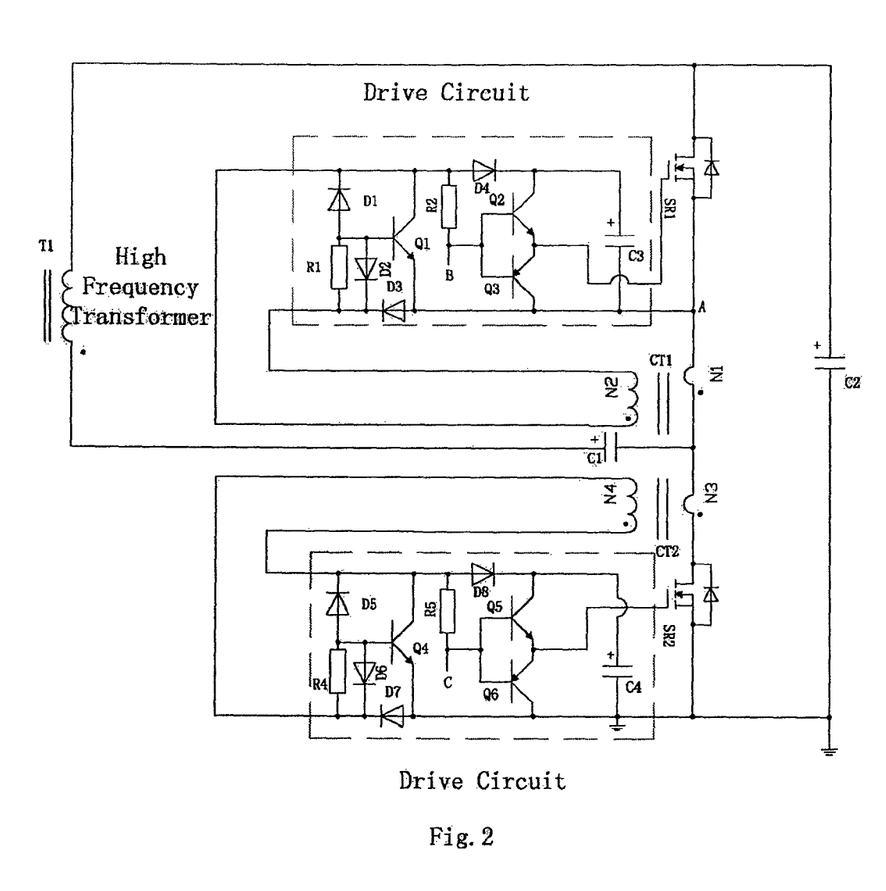
FIG. 2 is a schematic diagram of a T-type voltage doubler synchronous rectifier with two current transducers.

FIG. 2 is a schematic diagram of a T-type voltage doubler synchronous rectifier with two current transducers. The whole circuit consists of two drive circuits, two current transducers and a power circuit. The power circuit consists of a high frequency transformer T1, two synchronous rectifiers SR1 and SR2, two capacitors C1 and C2. The non-dotted terminal of the high frequency transformer T1 is connected to the drain of SR1 and to the positive terminal of the output capacitor C2. The dotted terminal of the high frequency transformer T1 is connected to the positive terminal of the energy storage capacitor C1. The source of SR1 is connected to the non-dotted terminal of the primary winding N1 of the current transducer CT1. The gate of SR1 is connected to the output port of its drive circuit. The drain of SR2 is connected to the dotted terminal of the primary winding N3 of the other current transducer CT2. The source of SR2 is connected to the negative terminal of the output capacitor. The gate of SR2 is connected to the output port of its drive circuit. The negative terminal of the energy storage capacitor C1 is connected to the dotted terminal of the primary winding N1 of the current transducer CT1 as well as the non-dotted terminal of the primary winding N3 of the other current transducer CT2.

The current transducer CT1 consists of a magnetic core, a primary winding N1 and a secondary winding N2. One terminal of the winding N1 is connected to one terminal of the energy storage capacitor C1. The other terminal of the winding N1 is connected to one terminal of SR1. The winding N2 is connected to the drive circuit of SR1. The current transducer CT2 consists of a magnetic core, a primary winding N3 and a secondary winding N4. One terminal of the winding N3 is connected to one terminal of the energy storage capacitor C1. The other terminal of the winding N3 is connected to one terminal of SR2. The winding N4 is connected to the drive circuit of SR2.

The signal shaping and reset circuit consists of a diode D1, a diode D2, a diode D3, a resistor R1 and a NPN transistor Q1. The cathode of the diode D1 is connected to the dotted terminal of the secondary winding N2 of the current transducer CT1 and to the collector of the transistor Q1. The anode of the diode D1 is connected to one node of the resistor R1, the base of the transistor Q1 and the anode of the diode D2. The other node of the resistor R1 is connected to the cathodes of the diode D2 and D3, and the non-dotted terminal of the secondary winding N2 of the current transducer CT1. The anode of diode D3 is connected to the emitter of the transistor Q1.

The push-pull driver consists of a NPN transistor Q2, a PNP transistor Q3 and a resistor R2. The base of the transistor Q2 is connected to the base of the transistor Q3 as well as one node of the resistor R2. The other node of the resistor R2 is connected to the dotted terminal of the secondary winding N2 of the current transducer CT1. The emitter of the transistor Q2 is connected to the emitter of the transistor Q3 as well as the gate of SR1. The collector of the transistor is connected to the anode of the diode D3.

The self-bias circuit consists of a diode D4 and an energy storage capacitor C3. The anode of the diode D4 is connected to the collector of the transistor Q1. The cathode of the diode D4 is connected to the positive terminal of the energy storage capacitor C3 as well as the collector of the transistor Q2. The negative terminal of the energy storage capacitor C3 is connected to the collector of the transistor Q3.

Figure 3:
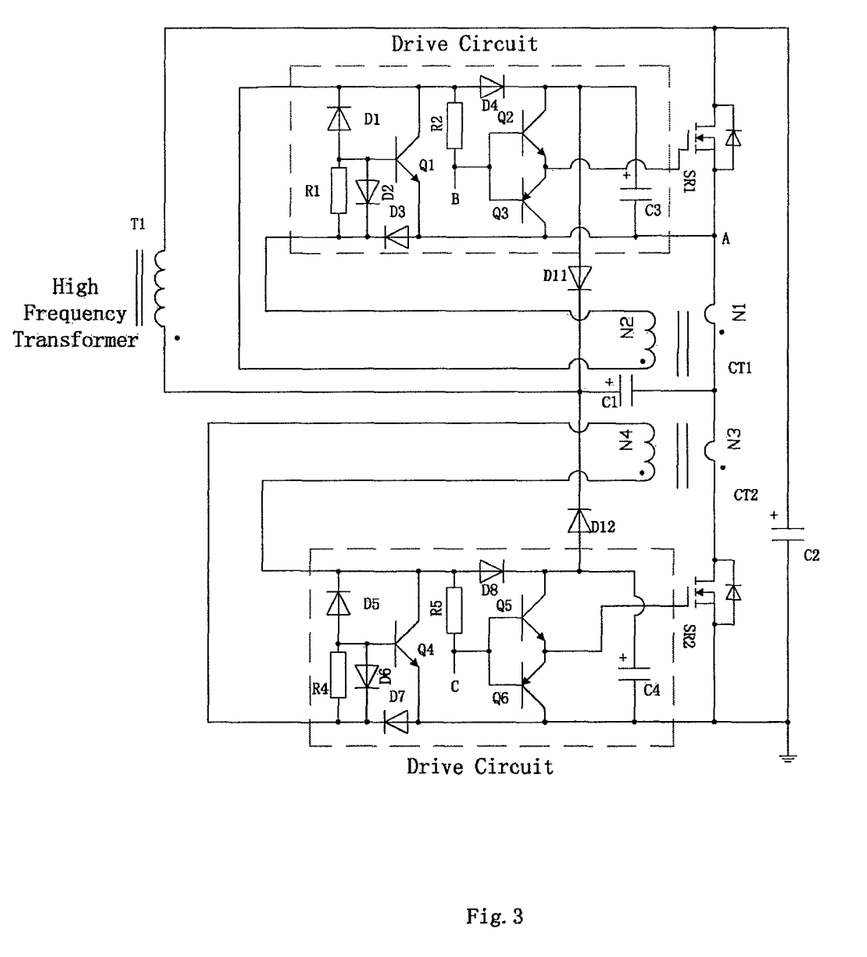
FIG. 3 is a schematic diagram of a T-type voltage doubler synchronous rectifier with an energy feedback circuit and two current transducers.

FIG. 3 is a schematic diagram of a T-type voltage doubler synchronous rectifier with an energy feedback circuit and two current transducers. Compare with FIG. 2, the main difference is that a clamp and energy feedback circuit is added in FIG. 3. The clamp and energy feedback circuit consists of a diode D11 and D12. The anode of the diode D11 is connected to the positive terminal of the energy storage capacitor C3. The cathode of the diode D11 is connected to the positive terminal of the energy storage capacitor C1. The anode of the diode D12 is connected to the positive terminal of the energy storage capacitor C4. The cathode of the diode D12 is connected to the positive terminal of the energy storage capacitor C1.

Figure 4:
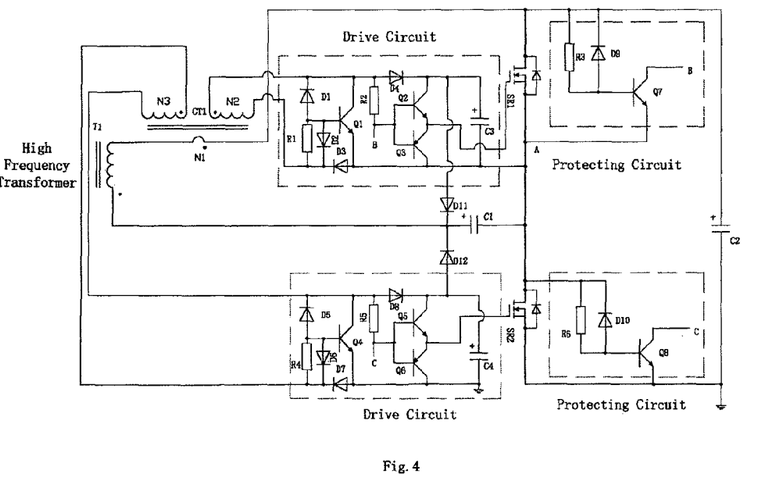
FIG. 4 is a schematic diagram of a T-type voltage doubler synchronous rectifier with an energy feedback circuit and one current transducer.

FIG. 4 is a schematic diagram of a T-type voltage doubler synchronous rectifier with an energy recycling circuit and one current transducer. Compared with FIG. 3, the main differences are that only one current transducer CT1 is used and a protecting circuit is added in FIG. 4 to prevent false drive signal. The power circuit consists of a high frequency transformer T1, two synchronous rectifiers SR1 and SR2, and two capacitors C1 and C2. The non-dotted terminal of the high frequency transformer T1 is connected to the non-dotted terminal of the primary winding N1 of the current transducer CT1. The dotted terminal of the high frequency transformer T1 is connected to the positive terminal of the energy storage capacitor C1. The source of the synchronous rectifier SR1 is connected to the negative terminal of the energy storage capacitor C1 as well as the drain of the synchronous rectifier SR2. The drain of SR1 is connected to the positive terminal of the output capacitor C2 and the dotted terminal of the primary winding N1 of the current transducer CT1. The gate of SR1 is connected to the output port of its drive circuit. The negative terminal of the output capacitor C2 is connected to the drain of SR2. The gate of SR2 is connected to the output port of its drive circuit.

The current transducer CT1 consists of a magnetic core, a primary winding N1, two secondary windings N2 and N3. One terminal of the winding N1 is connected to one terminal of the high frequency transformer T1. The other terminal of the winding N1 is connected to one terminal of SR1. The winding N2 is connected to the drive circuit of SR1. The winding N3 is connected to the drive circuit of SR2.

The protecting circuit consists of a resistor R3, a diode D9 and a transistor Q7. One node of the resistor R3 is connected to the cathode of the diode D9 as well as the drain of SR1. The other node of the resistor R3 is connected to the anode of the diode D9 and the base of the transistor Q7. The collector of the transistor Q7 is connected to the drive circuit. The emitter of the transistor Q7 is connected to the source of SR1.

Figure 5:
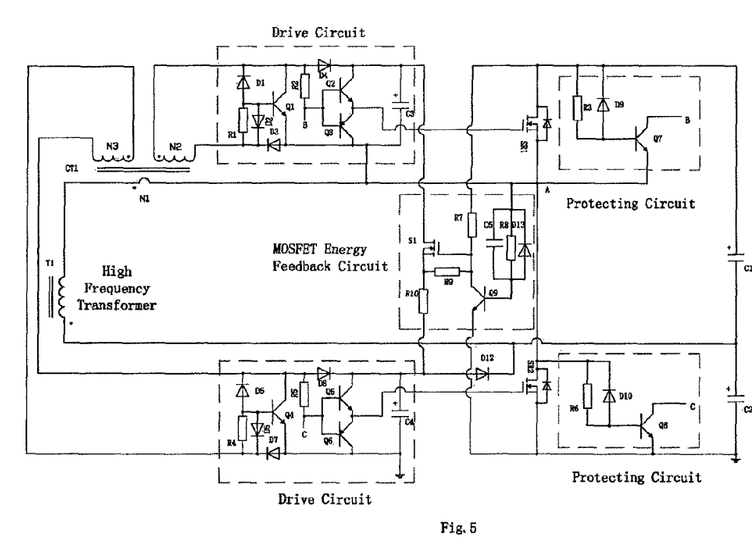
FIG. 5 is a schematic diagram of a common voltage doubler synchronous rectifier with a MOSFET energy feedback circuit and one current transducer.

FIG. 5 is a schematic diagram of a common voltage doubler synchronous rectifier with a MOSFET energy feedback circuit and one current transducer. Comparing with FIG. 4, the main differences are that a MOSFET energy feedback circuit is used to replace the diode D11, and the cathode of the diode D12 is connected to the positive terminal of the output capacitor C2 and the main circuit is a common voltage doubler rectifier.

The MOSFET energy feedback circuit consists a N-channel MOSFET S1, a resistor R7, a resistor R8, a resistor R9, a resistor R10, a capacitor C5, a diode D13 and a transistor Q9. The source of the N-channel MOSFET S1 is connected to one node of the resistor R10. The drain of the N-channel MOSFET S1 is connected to the positive terminal of the energy storage capacitor C3. The gate of the N-channel MOSFET S1 is connected to the collector of the transistor Q9. The other node of the resistor R10 is connected to the positive terminal of the energy storage capacitor C4. The emitter of the transistor Q9 is connected to the source of SR2. The base of the transistor Q9 is connected to the anode of the diode D13. The cathode of the diode D13 is connected to the source of SR1. One node of the capacitor C5 and one node of the resistor R8 are connected to the anode of the diode D13. The other nodes of C5 & R8 are connected to the cathode of the diode D13. One node of the resistor R9 is connected to the source of N-channel MOSFET S1. The other node of the resistor R9 is connected to the gate of N-channel MOSFET S1. One node of the resistor R7 is connected to the drain of SR1. The other node of the resistor R7 is connected to the gate of N-channel MOSFET S1.

The common voltage doubler rectifier consists of a high frequency transformer T1, two synchronous rectifiers SR1 and SR2, two capacitors C1 and C2. The non-dotted terminal of the high frequency transformer T1 is connected to the dotted terminal of the primary winding N1 of the current transducer CT1. The dotted terminal of the high frequency transformer T1 is connected to the positive terminal of the output capacitor C2. The source of SR1 is connected to the non-dotted terminal of the primary winding N1 of the current transducer CT1 as well as the drain of SR2. The drain of SR1 is connected to the positive terminal of the output capacitor C1. The gate of SR1 is connected to the output port of its drive circuit. The negative terminal of the output capacitor C2 is connected to the source of SR2. The gate of SR2 is connected to the output port of its drive circuit. The negative terminal of the output capacitor C1 is connected to the positive terminal of the output capacitor C2.

Figure 6:
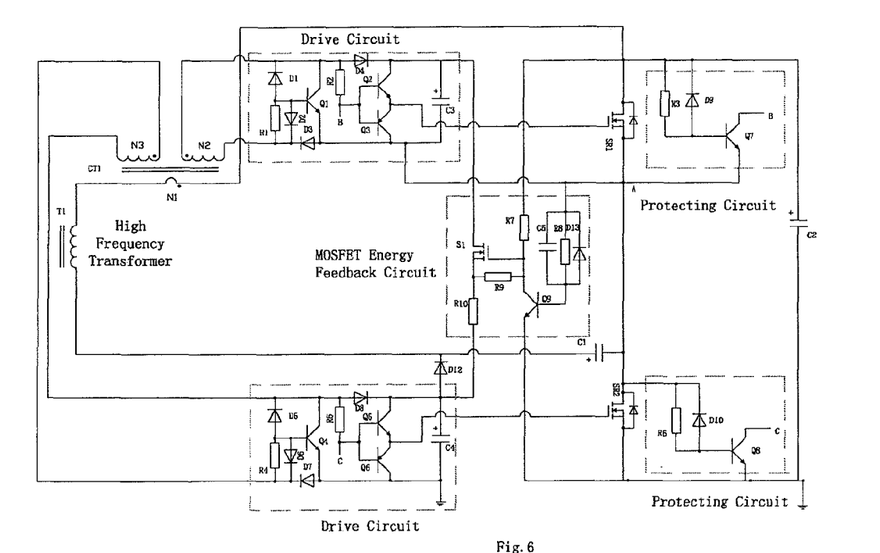
FIG. 6 is a schematic diagram of a T-type voltage doubler synchronous rectifier with a MOSFET energy feedback circuit and one current transducer.

FIG. 6 is a schematic diagram of a T-type voltage doubler synchronous rectifier with a MOSFET energy feedback circuit and one current transducer. Compared with FIG. 5, the main differences are that the cathode of the diode D12 is connected to the positive terminal of the capacitor C1, and the main circuit is a T-type voltage doubler rectifier. The T-type voltage doubler rectifier consists of a high frequency transformer T1, two synchronous rectifiers SR1 and SR2, two capacitors C1 and C2. The non-dotted terminal of the high frequency transformer T1 is connected to the non-dotted terminal of the primary winding N1 of the current transducer CT1. The dotted terminal of the high frequency transformer T1 is connected to the positive terminal of the energy storage capacitor C1. The source of the synchronous rectifier SR1 is connected to the negative terminal of the energy storage capacitor C1 as well as the drain of the synchronous rectifier SR2. The drain of SR1 is connected to the positive terminal of the output capacitor C2 and the dotted terminal of the primary winding N1 of the current transducer CT1. The gate of SR1 is connected to the output port of its drive circuit. The negative terminal of the output capacitor C2 is connected to the drain of SR2. The gate of SR2 is connected to the output port of its drive circuit.

Figure 7:
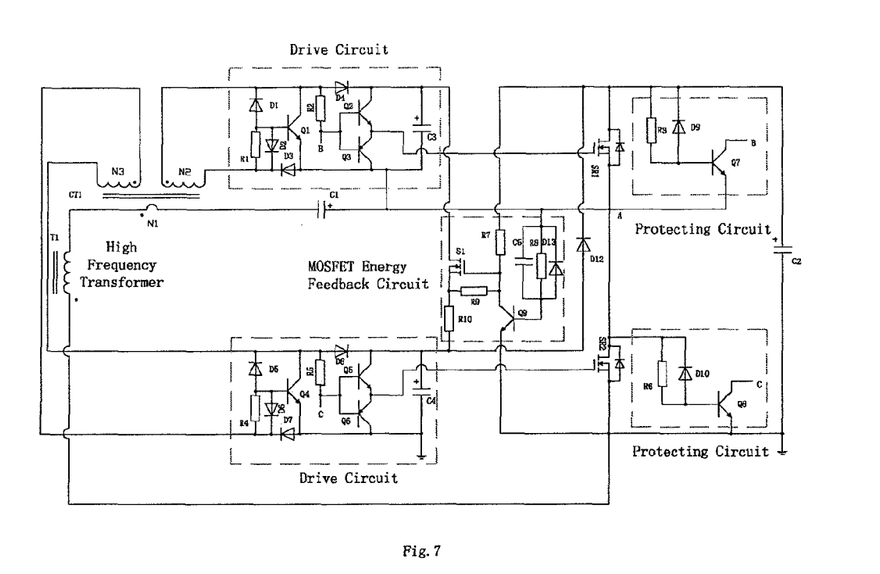
FIG. 7 is a schematic diagram of another T-type voltage doubler synchronous rectifier with a MOSFET energy feedback circuit and one current transducer.

FIG. 7 is a schematic diagram of another T-type voltage doubler synchronous rectifier with a MOSFET energy feedback circuit and one current transducer. Compared with FIG. 6, the main differences are that the cathode of the diode D12 is connected to the positive terminal of the output capacitor C2, and the power circuit is another T-type voltage doubler rectifier. The T-type voltage doubler rectifier in FIG. 7 consists of a high frequency transformer T1, two synchronous rectifiers SR1 and SR2, two capacitors C1 and C2. The non-dotted terminal of the high frequency transformer T1 is connected to the dotted terminal of the primary winding N1 of the current transducer CT1. The dotted terminal of the high frequency transformer T1 is connected to the source of SR2. The negative terminal of the capacitor C1 is connected to the non-dotted terminal of the primary winding N1 of the current transducer CT1. The positive terminal of the capacitor C1 is connected to the source of SR1. The drain of SR1 is connected to the positive terminal of the output capacitor C2. The gate of SR1 is connected to the output port of its drive circuit. The drain of SR2 is connected to the source of SR1. The gate of SR2 is connected to the output port of its drive circuit. The negative terminal of the output capacitor C2 is connected to the source of SR2.

Figure 8:
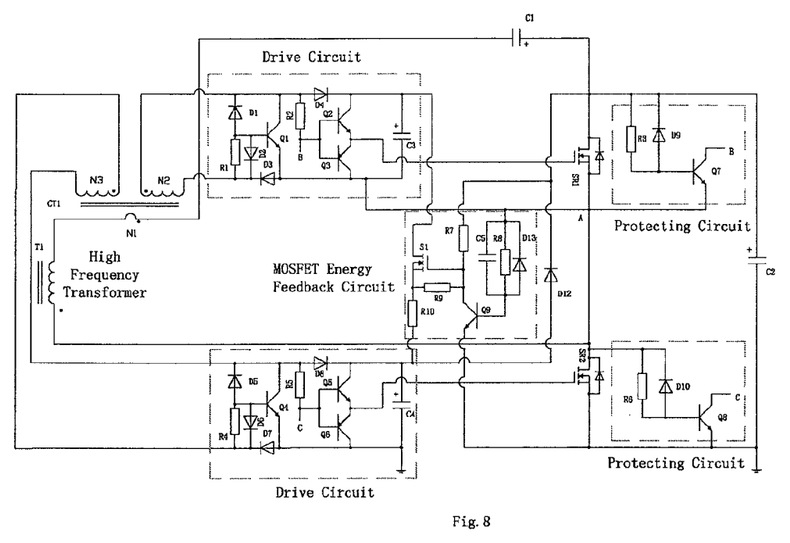
FIG. 8 is a schematic diagram of the third T-type voltage doubler synchronous rectifier with a MOSFET energy feedback circuit and one current transducer.

FIG. 8 is a schematic diagram of a third T-type voltage doubler synchronous rectifier with a MOSFET energy feedback circuit and one current transducer. Compared with FIG. 6, the main differences are that the cathode of the diode D12 is connected to the positive terminal of the output capacitor C2, and the main circuit is another T-type voltage doubler rectifier. The T-type voltage doubler rectifier in FIG. 8 consists of a high frequency transformer T1, two synchronous rectifiers SR1 and SR2, two capacitors C1 and C2. The non-dotted terminal of the high frequency transformer T1 is connected to the non-dotted terminal of the primary winding N1 of the current transducer CT1. The dotted terminal of the high frequency transformer T1 is connected to the drain of SR2. The negative terminal of the capacitor C1 is connected to the dotted terminal of the primary winding N1 of the current transducer CT1. The positive terminal of the capacitor C1 is connected to the drain of SR1. The source of SR1 is connected to the drain of SR2. The gate of SR1 is connected to the output port of its drive circuit. The source of SR2 is connected to the negative terminal of the output capacitor C2. The gate of SR2 is connected to the output port of its drive circuit. The positive terminal of the output capacitor C2 is connected to the drain of SR1.

Figure 9:
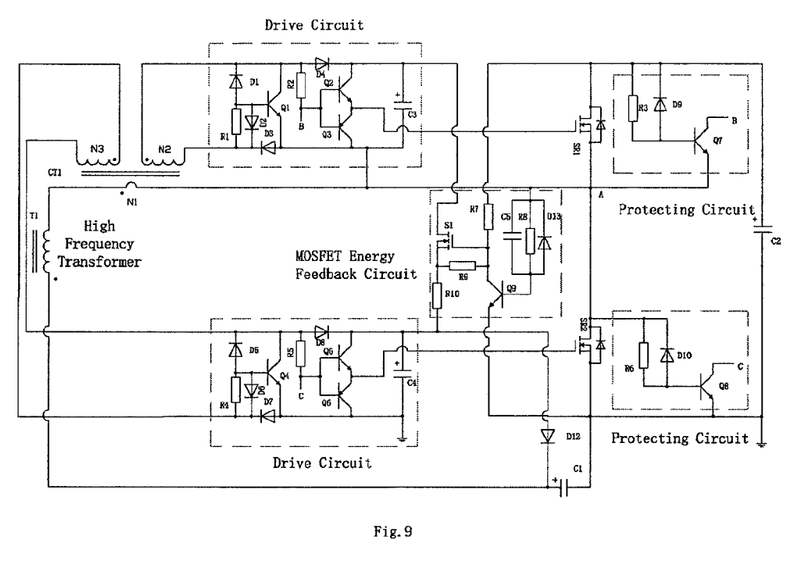
FIG. 9 is a schematic diagram of the fourth T-type voltage doubler synchronous rectifier with a MOSFET energy feedback circuit and one current transducer.

FIG. 9 is a schematic diagram of a fourth T-type voltage doubler synchronous rectifier with a MOSFET energy feedback circuit and one current transducer. Compare with FIG. 6, the main difference is that the main circuit is another T-type voltage doubler rectifier. The T-type voltage doubler rectifier in FIG. 9 consists of a high frequency transformer T1, two synchronous rectifiers SR1 and SR2, two capacitors C1 and C2. The non-dotted terminal of the high frequency transformer T1 is connected to the dotted terminal of the primary winding N1 of the current transducer CT1. The dotted terminal of the high frequency transformer T1 is connected to the positive terminal of the capacitor C1. The negative terminal of the capacitor C1 is connected to the source of SR2. The drain of SR2 is connected to the source of SR1. The gate of SR2 is connected to the output port of its drive circuit. The source of SR1 is connected to the non-dotted terminal of the primary winding N1 of the current transducer CT1. The drain of SR1 is connected to the positive terminal of the output capacitor C2. The gate of SR1 is connected to the output port of its drive circuit. The negative terminal of the output capacitor C2 is connected to the source of SR2.

Figure 10:
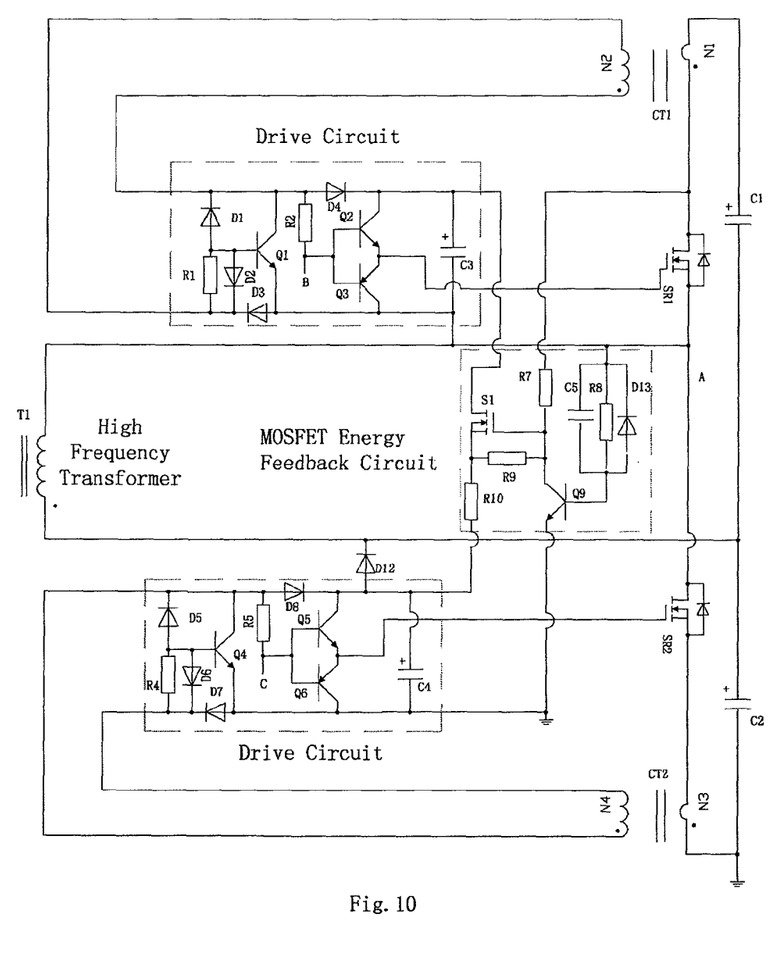
FIG. 10 is a schematic diagram of a common voltage doubler synchronous rectifier with a MOSFET energy feedback circuit and two current transducers.

FIG. 10 is a schematic diagram of a common voltage doubler synchronous rectifier with a MOSFET energy feedback circuit and two current transducers. Compare with FIG. 5, the main differences are that two current transducers are used, and the protecting circuits are removed. The current transducer CT1 in FIG. 10 consists of a magnetic core, a primary winding N1 and a secondary winding N2. One terminal of the winding N1 is connected to one terminal of the energy storage capacitor C1. The other terminal of the winding N1 is connected to one terminal of SR1. The winding N2 is connected to the drive circuit of SR1. The current transducer CT2 consists of a magnetic core, a primary winding N3 and a secondary winding N4. One terminal of the winding N3 is connected to one terminal of the energy storage capacitor C2. The other terminal of the winding N3 is connected to one terminal of SR2. The winding N4 is connected to the drive circuit of SR2.

Figure 11:
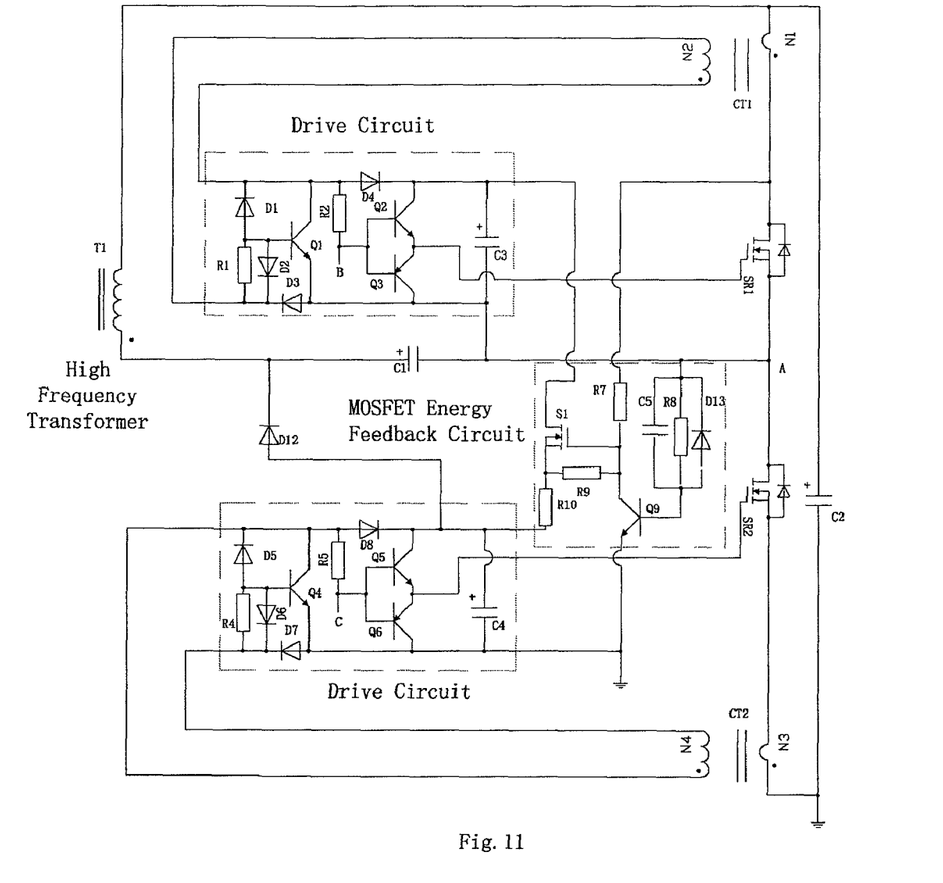
FIG. 11 is a schematic diagram of a T-type voltage doubler synchronous rectifier with a MOSFET energy feedback circuit and two current transducers.

FIG. 11 is a schematic diagram of a T-type voltage doubler synchronous rectifier with a MOSFET energy feedback circuit and two current transducers. Compare with FIG. 6, the main differences are that two current transducers are used, and the protecting circuits are removed. The current transducer CT1 in FIG. 11 consists of a magnetic core, a primary winding N1 and a secondary winding N2. One terminal of the winding N1 is connected to one terminal of the energy storage capacitor C1. The other terminal of the winding N1 is connected to one terminal of SR1. The winding N2 is connected to the drive circuit of SR1. The current transducer CT2 consists of a magnetic core, a primary winding N3 and a secondary winding N4. One terminal of the winding N3 is connected to one terminal of the energy storage capacitor C2. The other terminal of the winding N3 is connected to one terminal of SR2. The winding N4 is connected to the drive circuit of SR2.

Figure 12:
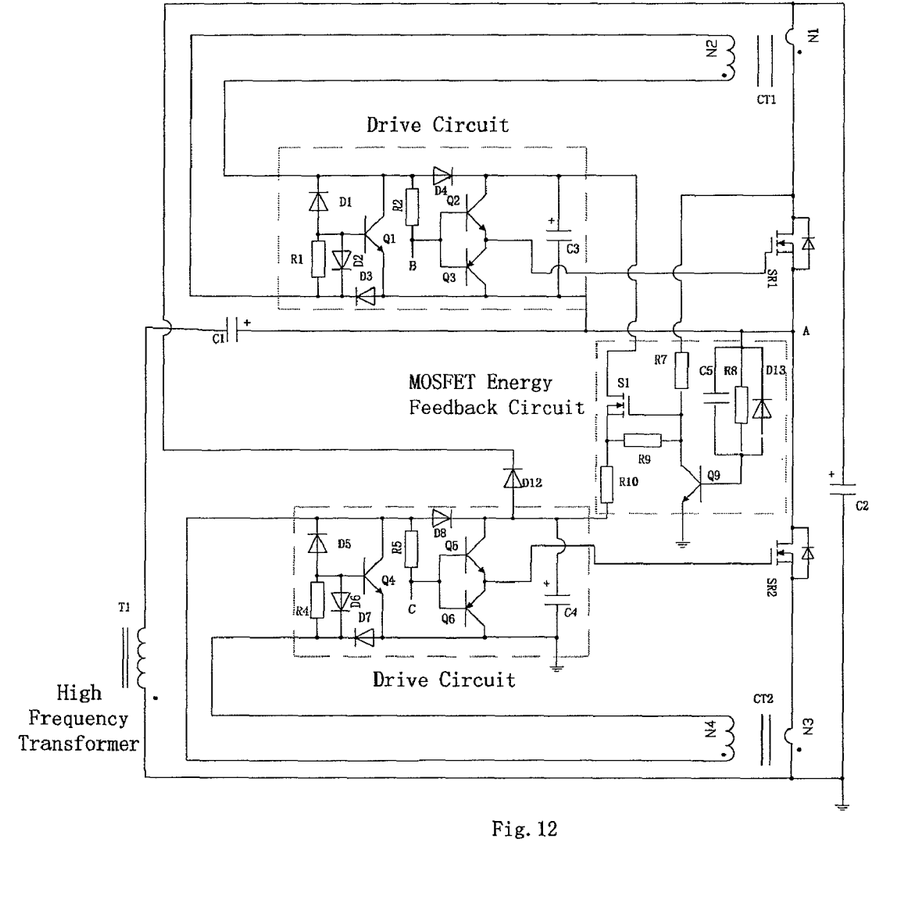
FIG. 12 is a schematic diagram of another T-type voltage doubler synchronous rectifier with a MOSFET energy feedback circuit and two current transducers.

FIG. 12 is a schematic diagram of another T-type voltage doubler synchronous rectifier with a MOSFET energy feedback circuit and two current transducers. Comparing with FIG. 7, the main differences are that two current transducers are used, and the protecting circuits are removed. The current transducers CT1 and CT2 are the same with those in FIG. 11.

Figure 13:
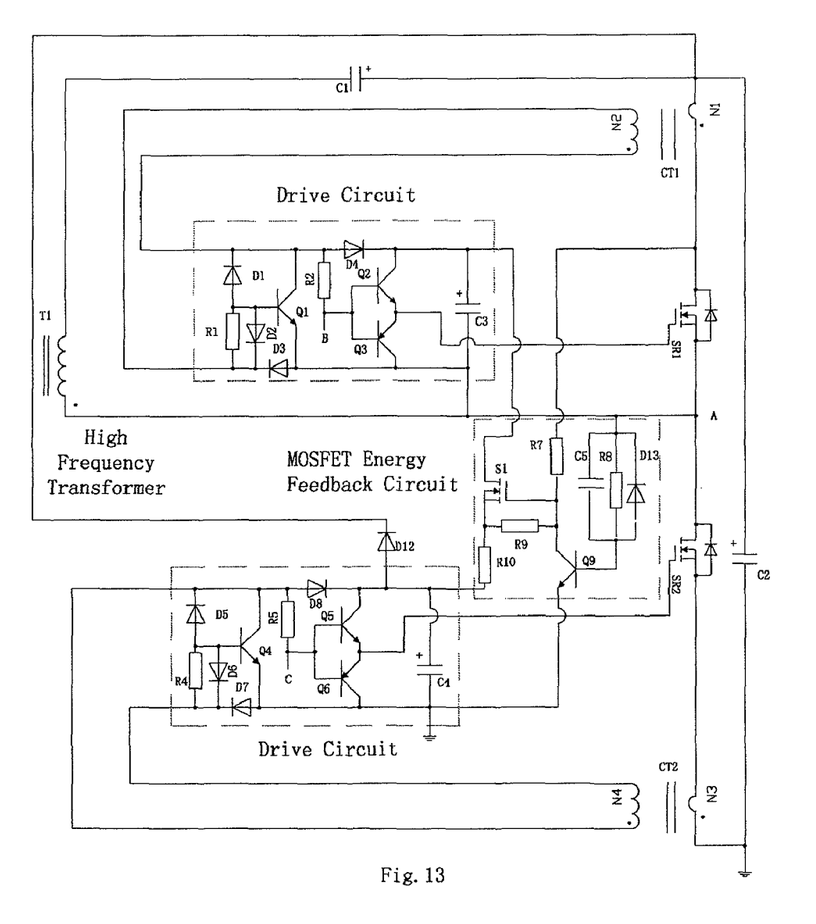
FIG. 13 is a schematic diagram of the third T-type voltage doubler synchronous rectifier with a MOSFET energy feedback circuit and two current transducers.

FIG. 13 is a schematic diagram of a third T-type voltage doubler synchronous rectifier with a MOSFET energy feedback circuit and two current transducers. Compared with FIG. 8, the main differences are that two current transducers are used, and the protecting circuits are removed. The current transducers CT1 and CT2 are the same with those in FIG. 11.

Figure 14:
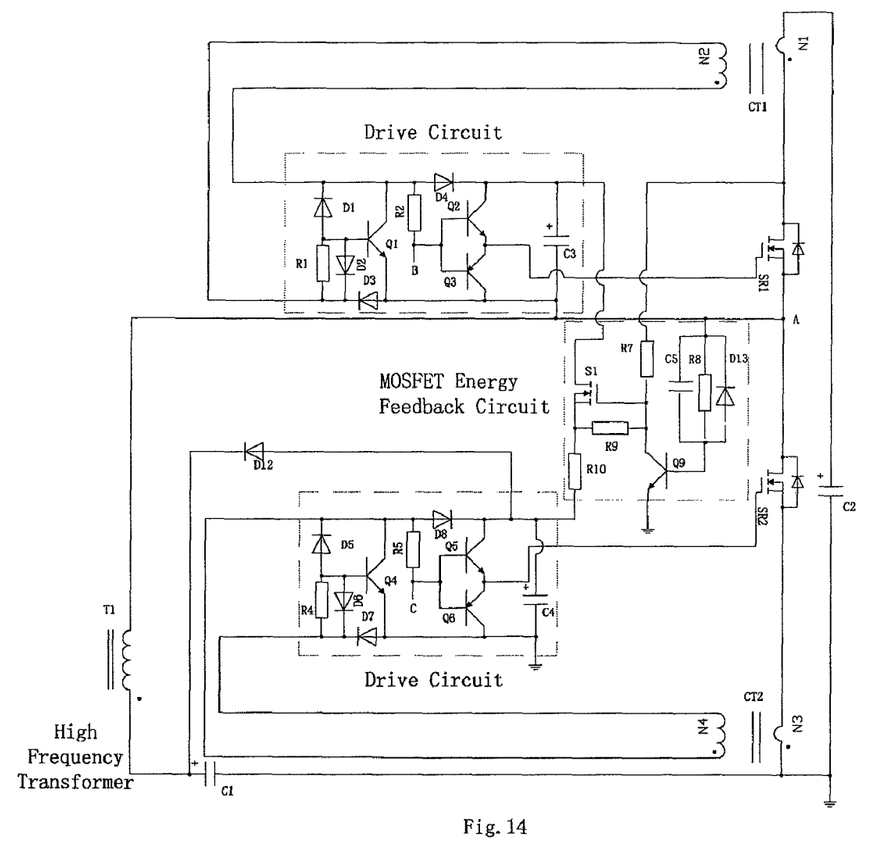
FIG. 14 is a schematic diagram of the fourth T-type voltage doubler synchronous rectifier with a MOSFET energy feedback circuit and two current transducers.

FIG. 14 is a schematic diagram of a fourth T-type voltage doubler synchronous rectifier with a MOSFET energy feedback circuit and two current transducers. Compare with FIG. 9, the main differences are that two current transducers are used, and the protecting circuits are removed. The current transducers CT1 and CT2 are the same with those in FIG. 11.

As is evident from the exemplary embodiments explained herein, an exemplary element of the present invention includes a current-driven synchronous rectifying drive circuit which has an energy feedback circuit that could feed the driving energy in both SRs back to the output. The whole circuit includes a clamp circuit, an energy feedback circuit, a high frequency transformer T1, a current transducer CT1, an energy storage capacitor C1, an output capacitor C2, two synchronous rectifiers SR1 and SR2, and two drive circuits for SR1 and SR2 respectively. The driving voltage of SR1 of the T-type voltage doubler rectifier is clamped to the voltage of the energy storage capacitor, and the energy of SR2 is fed back to the same energy storage capacitor. Each drive circuit may have a signal shaping and reset circuit, a self-bias circuit, and a push-pull driver.

The signal shaping and reset circuit is used to convert the synchronous rectifier's current signal (which is detected by the secondary winding of the current transducer CT1) into voltage signal and shape it into a pulse signal. It also enables the current transducer CT1 to reset when the current of the synchronous rectifier turns zero. The input port of the signal shaping and reset circuit is connected to one of the secondary windings of the current transducer CT1 and the output port is connected to the input port of the push-pull driver.

The self-bias circuit is used to store the energy from the current transducer CT1 in to capacitor C1 and to generate a voltage source which can regulate with the load and power consumption of the drive circuits in the synchronous rectifiers and power the whole drive circuit. The input port of the self-bias circuit is connected to the secondary winding of the current transducer CT1 while the output port is connected to the push-pull driver.

The push-pull driver is used to amplify the driving signal generated by the signal shaping and reset circuit to drive the synchronous rectifiers. The input port of the push-pull driver is connected to the output port of the signal shaping and reset circuit while the output is connected to the gate of the synchronous rectifier.

The clamp and energy feedback circuit is used to clamp the voltage of the self-bias circuit to the energy storage capacitor C1, and feed the redundant energy transferred to the current transducer CT1 back to the same energy storage capacitor C1. The input port of the clamp and energy circuit is connected to the self-bias circuit while the output port is connected to the storage capacitor C1.

Compared with the prior art technology discussed above, exemplary embodiments of the present invention has made improvements by reducing energy fed back thus improving efficiency, reducing a number of turns of the secondary winding of the current transducer thus reducing the cost of the CT, and providing a circuit that is now available in miscellaneous application, e.g., drive circuit with one CT or two.

The drive circuit and the power circuit are connected by the non-dotted terminal of the high frequency transformer T1 is connected to the non-dotted terminal of the primary winding N1 of the current transducer CT1. The dotted terminal of the high frequency transformer T1 is connected to the positive terminal of the energy storage capacitor C1. The source of the synchronous rectifier SR1 is connected to the negative terminal of the energy storage capacitor C1 as well as the drain of the synchronous rectifier SR2. The drain of SR1 is connected to the positive terminal of the output capacitor C2 as well as the dotted terminal of the primary winding N1 of the current transducer CT1. The gate of SR1 is connected to the output port of its drive circuit. The negative terminal of the output capacitor C2 is connected to the drain of SR2. The gate of SR2 is connected to the output port of its drive circuit.

When two current transducers are used, the drive circuit and the main circuit are connected wherein the non-dotted terminal of the high frequency transformer T1 is connected to the drain of SR1 as well as the positive terminal of the output capacitor C2. The dotted terminal of the high frequency transformer T1 is connected to the positive terminal of the energy storage capacitor C1. The source of SR1 is connected to the non-dotted terminal of the primary winding N1 of the current transducer CT1. The gate of SR1 is connected to the output port of its drive circuit. The drain of SR2 is connected to the dotted terminal of the primary winding N3 of the other current transducer CT2. The source of SR2 is connected to the negative terminal of the output capacitor C2. The gate of SR2 is connected to the output port of its drive circuit. The negative terminal of the energy storage capacitor C1 is connected to the dotted terminal of the primary winding N1 of the current transducer CT1 as well as the non-dotted terminal of the primary winding N3 of the other current transducer CT2.

Thus, in an exemplary embodiment, the signal shaping and reset circuit consists of a diode D1, a diode D2, a diode D3, a resistor R1 and a NPN transistor Q1. The cathode of the diode D1 is connected to the dotted terminal of the secondary winding N2 of the current transducer CT1 as well as the collector of the transistor Q1. The anode of the diode D1 is connected to one node of the resistor R1, the base of the transistor Q1 and the anode of the diode D2. The other node of the resistor R1 is connected to the cathodes of the diode D2 & D3, and the non-dotted terminal of the secondary winding N2 of the current transducer CT1. The anode of diode D3 is connected to the emitter of the transistor Q1.

The push-pull driver consists of a NPN transistor Q2, a PNP transistor Q3 and a resistor R2. The base of the transistor Q2 is connected to the base of the transistor Q3 as well as one node of the resistor R1. The other node of the resistor R2 is connected to the dotted terminal of the secondary winding N2 of the current transducer CT1. The emitter of the transistor Q2 is connected to the emitter of the transistor Q3 as well as the gate of SR1. The collector of the transistor Q3 is connected to the anode of the diode D3.

The self-bias circuit consists of a diode D4 and an energy storage capacitor C3. The anode of the diode D4 is connected to the collector of the transistor Q1. The cathode of the diode D4 is connected to the positive terminal of the energy storage capacitor C3 as well as the collector of the transistor Q2. The negative terminal of the energy storage capacitor C3 is connected to the collector of the transistor Q3.

The clamp and energy feedback circuit consists of a diode D11. The anode of the diode D11 is connected to the positive terminal of the energy storage capacitor C3. The cathode of the diode D11 is connected to the positive terminal of the energy storage capacitor C1.

In another exemplary embodiment of the present invention, a MOSFET energy feedback circuit is used to replace the clamp diode D11 in the drive circuit of synchronous rectifier SR1. Such an energy feedback circuit can be applied in voltage doubler rectifiers. It has the features that the drive voltages of the output voltage doubler rectifier can be clamped to a certain level, and the redundant energy can be fed back. The MOSFET energy feedback circuit consists a N-channel MOSFET S1, a resistor R7, a resistor R8, a resistor R9, a resistor R10, a capacitor C5, a diode D13 and a transistor Q9. The source of the N-channel MOSFET S1 is connected to one node of the resistor R10. The drain of the N-channel MOSFET S1 is connected to the positive terminal of the energy storage capacitor C3. The gate of the N-channel MOSFET S1 is connected to the collector of the transistor Q9. The other node of the resistor R10 is connected to the positive terminal of the energy storage capacitor C4. The emitter of the transistor Q9 is connected to the source of SR2. The base of the transistor Q9 is connected to the anode of the diode D13. The cathode of the diode D13 is connected to the source of SR1. One node of the capacitor C5 and one node of the resistor R8 are connected to the anode of the diode D13. The other nodes of C5 & R8 are connected to the cathode of the diode D13. One node of the resistor R9 is connected to the source of N-channel MOSFET S1. The other node of the resistor R9 is connected to the gate of N-channel MOSFET S1. One node of the resistor R7 is connected to the drain of synchronous rectifier SR1. The other node of the resistor R7 is connected to the gate of N-channel MOSFET S1.

In another exemplary embodiment of the present invention, when one current transducer is used, a protecting circuit is placed between the drain and the source of each SR. This protecting circuit consists of a resistor R3, a diode D9 and a transistor Q7. One node of the resistor R3 is connected to the cathode of the diode D9 as well as the drain of SR1. The other node of the resistor R3 is connected to the anode of the diode D9 and the base of the transistor Q7. The collector of the transistor Q7 is connected to the drive circuit. The emitter of the transistor Q7 is connected to the source of SR1.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A current-driven synchronous rectifying drive circuit designed for a T-type voltage doubler rectifier, the drive circuit comprising:
   a clamp and energy feedback circuit;
   a high frequency transformer,
   a current transducer;
   an energy storage capacitor;
   an output capacitor;
   a first and a second synchronous rectifier; and
   a first drive circuit connected to the first synchronous rectifier and a second drive circuit directly connected to the second synchronous rectifier;
   wherein a non-dotted terminal of the high frequency transformer being directly connected to a non-dotted terminal of a primary winding of the current transducer, a dotted terminal of the high-frequency transformer being directly connected to a positive terminal of the energy storage capacitor, a source of the first synchronous rectifier being directly connected to a negative terminal of the energy storage capacitor as well as a drain of the second synchronous rectifier, a drain of first synchronous rectifier being directly connected to a positive terminal of an output capacitor and a dotted terminal of the primary winding of the current transducer, a gate of first synchronous rectifier being directly connected to an output port of the first drive circuit, a negative terminal of the output capacitor being directly connected to a drain of second synchronous rectifier, and a gate of second synchronous rectifier being directly connected to an output port of the second drive circuit.

2. The current-driven synchronous rectifying drive circuit according to claim 1, wherein the first drive circuit and the second drive circuit each individually comprise a signal shaping and reset circuit, a self-bias circuit and a push-pull driver.

3. The current-driven synchronous rectifying drive circuit according to claim 2, wherein each signal shaping and reset circuit is provided to convert the respective synchronous rectifier current signal, which is detected by the current transducer, into a voltage signal and shape it into a pulse signal, and to enable the current transducer to reset when the current of the synchronous rectifier reaches to zero, wherein the input port of the signal shaping and reset circuit is connected to a secondary winding of current transducer and an output port is connected to an input port of a push-pull driver.

4. The current-driven synchronous rectifying drive circuit according to claim 1, wherein the self-bias circuit is provided to store energy from the current transducer in the first capacitor in order to generate a voltage source which can regulate with load and power consumption of the drive circuits in connection with each synchronous rectifier wherein the complete drive circuit is biased, and wherein an input port of the self-bias circuit is connected to a secondary winding of the current transducer while an output port is connected to a push-pull driver.

5. The current-driven synchronous rectifying drive circuit according to claim 1, wherein the push-pull driver is provided to amplify a drive signal generated by the signal shaping and reset circuit to drive the synchronous rectifiers, an input port of this circuit is connected to the signal shaping and reset circuit and an output is connected to a gate of the synchronous rectifier.

6. The current-driven synchronous rectifier as claimed in claim 1, further comprising a clamp and energy feedback circuit which comprises a first diode and a second diode, an anode of both diodes are connected respectively to the output ports of the first drive circuit and the second drive circuit, a cathode of both diodes connected to a positive terminal of the energy storage capacitor.

7. The current-driven synchronous rectifier as claimed in claim 6, further comprising a signal shaping and reset circuit comprising a first diode (D1), a second diode (D2), a third diode (D3), a resistor (R1), and a NPN transistor (Q1), wherein a cathode of the first diode (D1) is connected to a dotted terminal of a secondary winding (N2) of the current transducer and to a collector of the transistor (Q1), an anode of the first diode (D1) is connected to a first node of the resistor (R1), a base of the transistor (Q1), and to an anode of the second diode (D2), a second node of the resistor (R1) is connected to cathodes of the second and third diodes (D2 and D3) and to a non-dotted terminal of a secondary winding (N2) of the current transducer, an anode of third diode (D3) is connected to an emitter of the transistor (Q1), wherein a push-pull driver comprises a NPN transistor (Q2), a PNP transistor (Q3), and a second resistor (R2), a base of a second transistor (Q2) is connected to a base of a third transistor (Q3) and a node of the second resistor (R2), a second node of the second resistor (R2) is connected to a dotted terminal of a secondary winding (N2) of the current transducer, an emitter of the second transistor (Q2) is connected to an emitter of the third transistor (Q3) and a gate of first synchronous rectifier, a collector of the third transistor (Q3) is connected to an anode of the third diode (D3), wherein a self-bias circuit comprises a fourth diode (D4) and a third energy storage capacitor (C3), an anode of the fourth diode (D4) is connected to a collector of the transistor (Q1), a cathode of the fourth diode (D4) is connected to a positive terminal of the third energy storage capacitor (C3) and a collector of the second transistor (Q2), and a negative terminal of the third energy storage capacitor (C3) is connected to a collector of a third transistor (Q3).

8. The current-driven synchronous rectifier as claimed in claim 1, further comprising a clamp and energy feedback circuit which is a MOSFET energy feedback circuit provided for a voltage doubler rectifying circuit comprising a commonly seen voltage doubler rectify where the MOSFET energy feedback circuit comprises a N-channel MOSFET (S1), a first resistor (R7), a second resistor (R8), a third resistor (R9), a fourth resistor (R10), a capacitor (C5), a diode (D13) and a transistor (Q9), a source of the N-channel MOSFET (S1) is connected to a first node of the fourth resistor (R10), a drain of the N-channel MOSFET (S1) is connected to a positive terminal of the energy storage capacitor (C3), a gate of the N-channel MOSFET (S1) is connected to a collector of the transistor (Q9), a second node of the fourth resistor (R10) is connected to a positive terminal of the energy storage capacitor (C4), an emitter of the transistor (Q9) is connected to a source of the second synchronous rectifier (SR2), a base of the transistor (Q9) is connected to an anode of the diode (D13), an cathode of the diode (D13) is connected to a source of first synchronous rectifier (SR1), a firsts node of the capacitor (C5) and a first node of the second resistor (R8) are connected to an anode of the diode (D13), a second node of bother the capacitor (C5) and the second resistor (R8) are connected to an cathode of the diode (D13), a first node of the third resistor (R9) is connected to a source of N-channel MOS (S1), a second node of the third resistor (R9) is connected to a gate of N-channel MOSFET (S1), a first node of the first resistor (R7) is connected to a drain of the first synchronous rectifier (SR1), and a second node of the first resistor (R7) is connected to the gate of N-channel MOSFET (S1).

9. The current-driven synchronous rectifier as claimed in claim 1, wherein when one channel current transducer is provided, locating a protecting circuit between the drain and a source of each synchronous rectifier preventing a false drive signal, wherein the protecting circuit consists of a resistor, a diode and a transistor with a first node of the resistor connected to a cathode of the diode and the drain of the first synchronous rectifier, a second node of the resistor connected to a anode of the diode and a base of the transistor, a collector of the transistor connected to the drive circuit, and a emitter of the transistor connected to a source of the first synchronous rectifier.

10. The current-driven synchronous rectifier as claimed in claim 6, wherein when one channel current transducer is provided, locating a protecting circuit between the drain and a source of each synchronous rectifier preventing a false drive signal, wherein the protecting circuit consists of a resistor, a diode and a transistor with a first node of the resistor connected to a cathode of the diode and the drain of the first synchronous rectifier, a second node of the resistor connected to a anode of the diode and a base of the transistor, a collector of the transistor connected to the drive circuit, and a emitter of the transistor connected to a source of the first synchronous rectifier.

11. The current-driven synchronous rectifier as claimed in claim 7, wherein when one channel current transducer is provided, locating a protecting circuit between the drain and a source of each synchronous rectifier preventing a false drive signal, wherein the protecting circuit consists of a resistor, a diode and a transistor with a first node of the resistor connected to a cathode of the diode and the drain of the first synchronous rectifier, a second node of the resistor connected to a anode of the diode and a base of the transistor, a collector of the transistor connected to the drive circuit, and a emitter of the transistor connected to a source of the first synchronous rectifier.

12. The current-driven synchronous rectifier as claimed in claim 8, wherein when one channel current transducer is provided, locating a protecting circuit between the drain and a source of each synchronous rectifier preventing a false drive signal, wherein the protecting circuit consists of a resistor, a diode and a transistor with a first node of the resistor connected to a cathode of the diode and the drain of the first synchronous rectifier, a second node of the resistor connected to a anode of the diode and a base of the transistor, a collector of the transistor connected to the drive circuit, and a emitter of the transistor connected to a source of the first synchronous rectifier.

13. A current-driven synchronous rectifying drive circuit designed for a T-type voltage doubler rectifier, the drive circuit comprising:
   a clamp and energy feedback circuit;
   a high frequency transformer,
   a current transducer;
   an energy storage capacitor;
   an output capacitor;
   a first and a second synchronous rectifier;

a first drive circuit connected to the first synchronous rectifier and a second drive circuit connected to the second synchronous rectifier; and a second current transducer;

wherein a non-dotted terminal of the high frequency transformer being directly connected to a drain of the first synchronous rectifier and a positive terminal of the output capacitor, a dotted terminal of the high frequency transformer being directly connected to a positive terminal of the energy storage capacitor;

a source of the first synchronous rectifier being directly connected to a non-dotted terminal of a primary winding of the current transducer;

a gate of the first synchronous rectifier being directly connected to an output port of the first drive circuit, a drain of the second synchronous rectifier being directly connected to a dotted terminal of a primary winding of the second current transducer;

a source of the second synchronous rectifier being directly connected to a negative terminal of the output capacitor, a gate of second synchronous rectifier directly connected to the output port of its drive circuit; and a negative terminal of the energy storage capacitor is directly connected to a dotted terminal of a primary winding of the first current transducer and to a non-dotted terminal of the primary winding of the second current transducer.

14. The current-driven synchronous rectifying drive circuit according to claim 13, wherein the first drive circuit and the second drive circuit each individually comprise a signal shaping and reset circuit, a self-bias circuit and a push-pull driver.

15. The current-driven synchronous rectifying drive circuit according to claim 14, wherein each signal shaping and reset circuit is provided to convert the respective synchronous rectifier current signal, which is detected by the current transducer, into a voltage signal and shape it into a pulse signal, and to enable the current transducer to reset when the current of the synchronous rectifier reaches to zero, wherein the input port of the signal shaping and reset circuit is connected to a secondary winding of current transducer and an output port is connected to an input port of a push-pull driver.

16. The current-driven synchronous rectifying drive circuit according to claim 14, wherein the self-bias circuit is provided to store energy from the current transducer in the first capacitor in order to generate a voltage source which can regulate with load and power consumption of the drive circuits in connection with each synchronous rectifier wherein the complete drive circuit is biased, and wherein an input port of the self-bias circuit is connected to a secondary winding of the current transducer while an output port is connected to a push-pull driver.

17. The current-driven synchronous rectifying drive circuit according to claim 14, wherein a push-pull driver is provided to amplify a drive signal generated by the signal shaping and reset circuit to drive the synchronous rectifiers, an input port of this circuit is connected to the signal shaping and reset circuit and an output is connected to a gate of the synchronous rectifier.

18. The current-driven synchronous rectifier as claimed in claim 13, further comprises a clamp and energy feedback circuit which comprises a first diode and a second diode, an anode of both diodes are connected respectively to the output ports of the first drive circuit and the second drive circuit, a cathode of both diodes connected to a positive terminal of the energy storage capacitor.

19. The current-driven synchronous rectifier as claimed in claim 18, further comprising a signal shaping and reset circuit comprising a first diode (D1), a second diode (D2), a third diode (D3), a resistor (R1), and a NPN transistor (Q1), wherein a cathode of the first diode (D1) is connected to a dotted terminal of a secondary winding (N2) of the current transducer and to a collector of the transistor (Q1), an anode of the first diode (D1) is connected to a first node of the resistor (R1), a base of the transistor (Q1), and to an anode of the second diode (D2), a second node of the resistor (R1) is connected to cathodes of the second and third diodes (D2 and D3) and to a non-dotted terminal of a secondary winding (N2) of the current transducer, an anode of third diode (D3) is connected to an emitter of the transistor (Q1), wherein a push-pull driver comprises a NPN transistor (Q2), a PNP transistor (Q3), and a second resistor (R2), a base of a second transistor (Q2) is connected to a base of a third transistor (Q3) and a node of the second resistor (R2), a second node of the second resistor (R2) is connected to a dotted terminal of a secondary winding (N2) of the current transducer, an emitter of the second transistor (Q2) is connected to an emitter of the third transistor (Q3) and a gate of first synchronous rectifier, a collector of the third transistor (Q3) is connected to an anode of the third diode (D3), wherein a self-bias circuit comprises a fourth diode (D4) and a third energy storage capacitor (C3), an anode of the fourth diode (D4) is connected to a collector of the transistor (Q1), a cathode of the fourth diode (D4) is connected to a positive terminal of the third energy storage capacitor (C3) and a collector of the second transistor (Q2), and a negative terminal of the third energy storage capacitor (C3) is connected to a collector of a third transistor (Q3).

20. The current-driven synchronous rectifier as claimed in claim 13, further comprising a clamp and energy feedback circuit which is a MOSFET energy feedback circuit provided for a voltage doubler rectifying circuit comprising a commonly seen voltage doubler rectify where the MOSFET energy feedback circuit comprises a N-channel MOSFET (S1), a first resistor (R7), a second resistor (R8), a third resistor (R9), a fourth resistor (R10), a capacitor (C5), a diode (D13) and a transistor (Q9), a source of the N-channel MOSFET (S1) is connected to a first node of the fourth resistor (R10), a drain of the N-channel MOSFET (S1) is connected to a positive terminal of the energy storage capacitor (C3), a gate of the N-channel MOSFET (S1) is connected to a collector of the transistor (Q9), a second node of the fourth resistor (R10) is connected to a positive terminal of the energy storage capacitor (C4), an emitter of the transistor (Q9) is connected to a source of the second synchronous rectifier (SR2), a base of the transistor (Q9) is connected to an anode of the diode (D13), an cathode of the diode (D13) is connected to a source of first synchronous rectifier (SR1), a firsts node of the capacitor (C5) and a first node of the second resistor (R8) are connected to an anode of the diode (D13), a second node of bother the capacitor (C5) and the second resistor (R8) are connected to an cathode of the diode (D13), a first node of the third resistor (R9) is connected to a source of N-channel MOSFET (S1), a second node of the third resistor (R9) is connected to a gate of N-channel MOSFET (S1), a first node of the first resistor (R7) is connected to a drain of the first synchronous rectifier (SR1), and a second node of the first resistor (R7) is connected to the gate of N-channel MOSFET (S1).

\* \* \* \* \*